Jan. 1, 1935.  F. C. FRANK  1,986,430
BRAKE
Filed Aug. 6, 1931
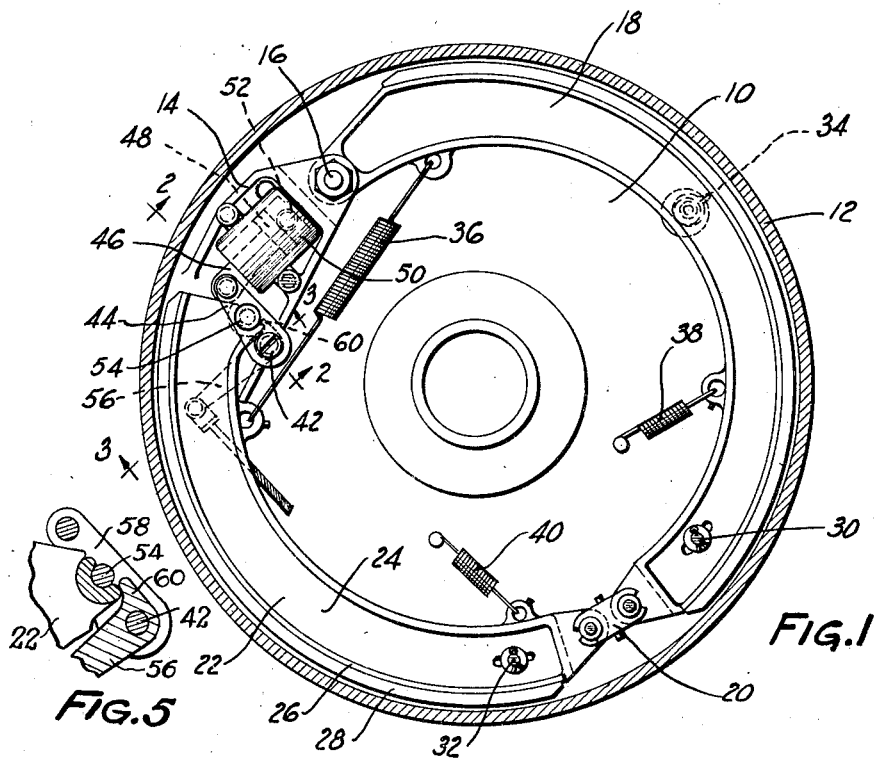
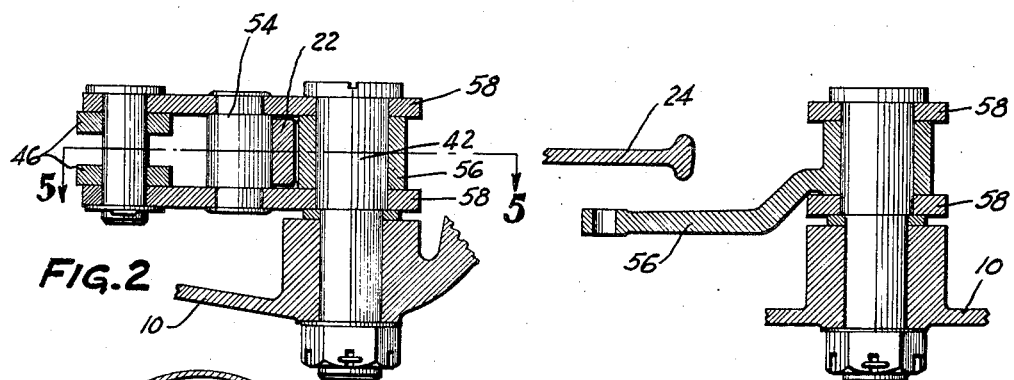
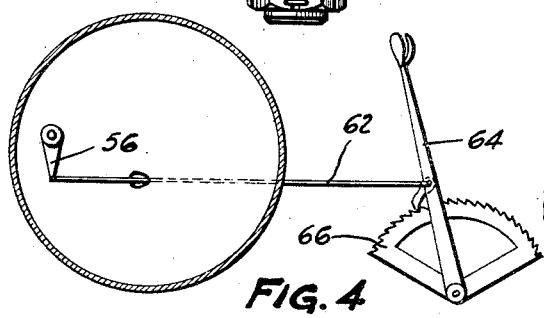
INVENTOR.
FREDERICK C. FRANK
BY *J. H. Fowler*
ATTORNEY Patented Jan. 1, 1935

1,986,430

UNITED STATES PATENT OFFICE 1,986,430

BRAKE

Frederick C. Frank, South Bend, Ind., assignor to Bendix Brake Company, South Bend, Ind., a corporation of Illinois Application August 6, 1931, Serial No. 555,487

6 Claims. (Cl. 188—106)

This invention relates to brakes and more particularly to internal expanding brakes particularly adaptable for aircraft.

Heretofore in brakes for airplanes and particularly hydraulic brakes for airplanes no provision has been made for locking the brake in applied position, when the plane is at rest. It is the aim of the present invention to overcome this objectional feature by the provision of a brake coupled with an auxiliary operating means and means for locking the auxiliary operating means to retain the brake in applied position.

An object of the invention is to provide the brake of simple structure including means for locking the brake in applied position.

Another object of the invention is to provide a brake for an airplane including means for hydraulically operating the brake and means associated therewith for locking the brake in applied position.

A feature of the invention is a brake having operating means, and auxiliary operating means associated therewith operable from the cockpit of the fuselage of a plane, and means closely associated with the auxiliary operating means for locking the brake in applied position.

Other objects and features of the invention will appear from the following description taken in connection with the drawing forming a part of this specification, and in which:

Figure 1 is a vertical sectional view of a brake drum taken just back of the head of the brake illustrating the friction element in side elevation and showing the invention as applied;

Figure 2 is a sectional view substantially on line 2—2 of Figure 1;

Figure 3 is a sectional view substantially on line 3—3 of Figure 1;

Figure 4 is a diagrammatical illustration; and

Figure 5 is a sectional view substantially on line 5—5 of Figure 2.

Referring to the drawing for more specific details of the invention, 10 represents a fixed support such as a backing plate. The backing plate has associated therewith a rotatable drum 12 which may be secured to a wheel, not shown.

Positioned on the backing plate is a bracket 14 supporting a fixed anchor 16. A brake shoe 18 has one end pivotally connected to the anchor and connected to the other end of the shoe 18 by a suitable adjusting member 20 is a brake shoe 22. The shoes 18 and 22 are of the conventional type, each including a web 24 supporting a rim 26 to which is suitably secured a lining 28 adaptable for cooperation with the drum. The shoes are supported on the backing plate by suitable steady rests 30 and 32 and the shoe 18 engages an adjusting member 34 when in the off position.

As shown, the shoes are connected by a suitable return spring 36. The shoe 18 is connected to the backing plate by a return spring 38 and the shoe 22 is connected to the backing plate by a return spring 40. The springs 36, 38 and 40 serve to return the shoes to the off position and to retain them when in this position in proper spaced relation to the drum.

Positioned on the backing plate is a fixed stud or pivot 42. A lever 44 has one of its ends pivotally connected to the pivot 42 and its other end is pivotally connected to a piston rod 46 having secured thereto a piston 48 adaptable for reciprocation in a cylinder 50 bolted or otherwise secured to the bracket 14. The cylinder is provided with a port 52 for admission of fluid under pressure, and the lever has positioned thereon a stud 54 engaging a notch in the free end of the shoe 22.

When fluid is introduced in the cylinder through the port 52 the piston is actuated to rock the lever 44 on its pivot 42 to apply the shoe 22. Upon application of the shoe 22 the shoe is given a slight centrifugal movement and this movement is augmented by the wiping action of the drum to apply the shoe 18. Generally brakes of this type have no means for retaining the brake in the applied position. To overcome this objection an auxiliary operating means associated with means for locking the brake in applied position is supplied, so that when the plane is at rest, danger of its being moved or placed in motion through various causes, such as wind and personal interferences is eliminated. To that end the brake is equipped with an auxiliary applying means including a lever or cam and means for actuating the cam to apply the brake together with means for locking the cam against angular movement.

As shown, the backing plate or the fixed support 10 has thereon a boss in which is positioned the stud 42. A crank lever 56 is positioned for rotation on the stud or fixed pivot 42 between corresponding plates 58 constituting a lever 44. The stud 54 connects the plates and engages the notch in the end of the shoe 22. The lever 56 has formed thereon a lobe 60 adapted to engage the free end of the shoe 22, so that upon movement of the lever 56 through a suitable tension member connected thereto the shoe 22 may be moved into drum engagement to apply the brake and the brake may be locked in the applied position through means of a conventional operating lever and rack, positioned in the cockpit of a plane. As shown, the crank lever 56 is connected by a suitable rod 62 to an operating lever 64 having associated therewith a rack 66. It is, of course, to be understood that the operating lever is under control of the operator. By means of this structure the brake may be readily applied and locked in applied position, at the will of the operator.

Although this invention has been described in connection with certain specific embodiments the principles involved are susceptible of numerous applications to those skilled in the art. The invention is, therefore, to be limited only as indicated by the scope of the appended claims. It is not my intention to claim in the present application any subject-matter disclosed in my copending application No. 555,486.

Having thus described my invention what I claim and desire to secure by Letters Patent is:

1. A brake comprising a friction element, a lever pivoted on the backing plate at the force applying end of the friction element, a stud on the lever engaging the friction element, means for hydraulically operating the lever, a crank on the pivot for the lever, a cam carried by the crank engaging the friction element, means for actuating the crank and means for locking the crank against movement.

2. A brake comprising a friction element, an applying means therefor including a parallel member pivotally connected at one end to a fixed pivot and pivotally connected at the other end to a force applying means and a crank positioned on the pivot between the parallel members.

3. A brake comprising a friction element having one end pivoted on a fixed anchor, an actuating member cooperating with the other end of the friction element including a lever pivoted on a fixed support and a stud on the lever engaging the friction element, an auxiliary operating means associated with the lever including a crank, a cam on the crank engaging the friction element and a tension member for operating the crank.

4. A brake comprising a support, a pivot on the support, a two part lever on the pivot, a thrust member connecting the two parts of the lever, a crank positioned on the pivot between the two parts of the lever and a cam on the crank.

5. A brake comprising a support, a fixed pivot on the support, a two part lever on the pivot, a thrust member connecting the two parts of the lever, a crank positioned on the pivot between the two parts of the lever, a cam on the crank and a tension member for actuating the crank.

6. A brake comprising a friction element, a support, a stud carried by said support, a lever pivoted on said stud and arranged to actuate the friction element, means for hydraulically operating the lever, a crank pivoted on said stud, a lobe on the crank arranged to engage the friction element for actuating the same, and means for manually operating the crank.

FREDERICK C. FRANK.